Aug. 16, 1960 N. L. WISEMAN 2,949,548
VARIABLE MULTIVIBRATOR
Filed June 18, 1958
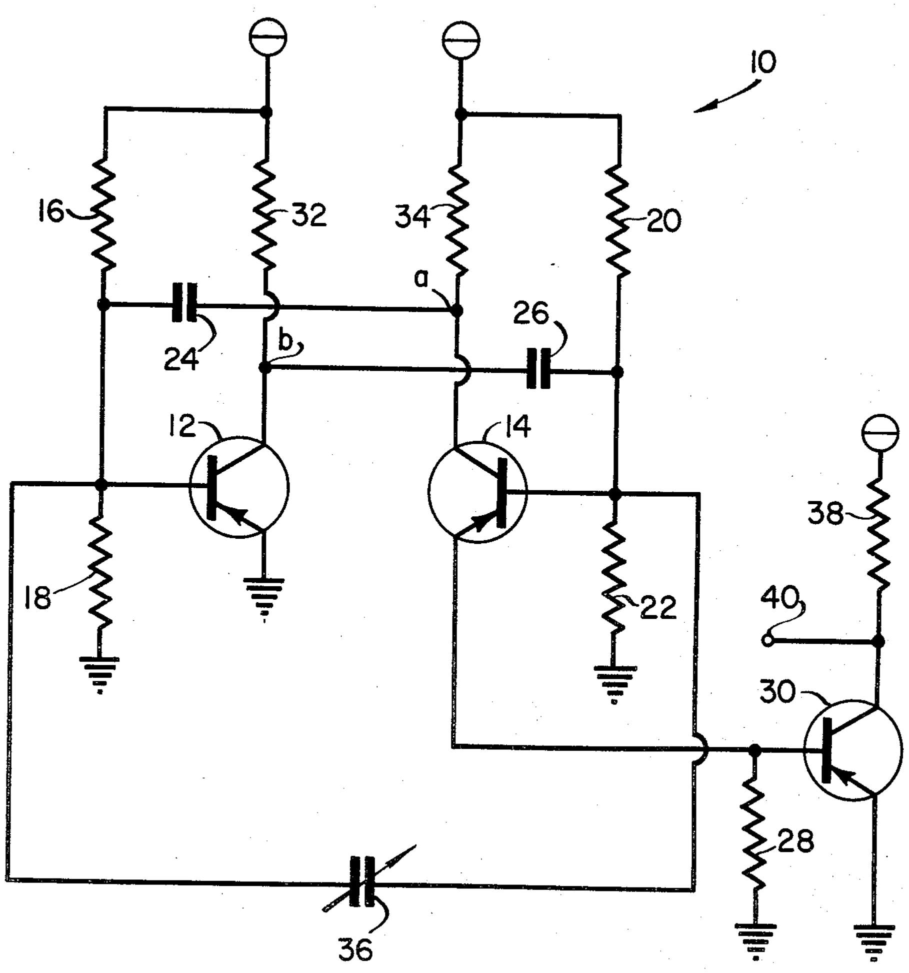
INVENTOR.
NEIL L. WISEMAN
BY Richard G. Stahr
ATTORNEY

United States Patent Office 2,949,548
Patented Aug. 16, 1960

2,949,548

VARIABLE MULTIVIBRATOR

Neil L. Wiseman, Rochester, N.Y., assignor to General Dynamics Corporation, Rochester, N.Y., a corporation of Delaware Filed June 18, 1958, Ser. No. 742,775

5 Claims. (Cl. 307—88.5)

This invention relates to a multivibrator and, more specifically, to a multivibrator including new and improved means for adjusting the operating frequency thereof.

One of the objects of the present invention is to provide a new and improved multivibrator.

Another object is to provide a multivibrator including new and improved means for adjusting the operating frequency thereof.

A further object is to provide a multivibrator including a pair of semiconductor devices in which the frequency of operation of the multivibrator is controlled by an impendance element common to both of the semiconductor devices.

Another object is to provide a switching device having a pair of semiconductor devices which are cross-coupled by condensers and which includes a common capacitive element that is alternately connected in parallel with each of the coupling condensers to provide means for uniformly adjusting the frequency of operation of the switching device.

In accordance with these and many other objects, an embodiment of the invention comprises a pair of semiconductor devices each including at least a base electrode and a collector electrode. The base and collector electrodes of the two semiconductor devices are cross-coupled by a pair of condensers which are alternately charged and discharged to determine the alternate periods of conduction of the two devices. In order to provide means for adjusting the frequency of operation of the multivibrator, a common capacitive element connected between the base electrodes of the two semiconductor devices. Thus, as alternate ones of these devices are rendered conductive, the current saturation of the collector electrode in the conductive device effectively connects the capacitive means in parallel with one of the coupling condensers. By making the common capacitive element adjustable, the time constants of the circuits for the coupling condensers can be uniformly varied to select a desired operating frequency for the multivibrator.

Many other objects and advantages of the present invention will become apparent from the following detailed description when considered in conjunction with the single sheet of drawings which forms a schematic diagram of a multivibrator embodying the present invention.

Referring now more specifically to the drawings, therein is illustrated a multivibrator, indicated generally as 10, including a pair of semiconductor devices 12 and 14, each of which is provided with a base electrode, an emitter electrode and a collector electrode. The transistors 12 and 14 are shown as being of the PNP type although NPN semiconductor devices could be used by modifying the necessary operating potentials. The base electrode of the transistor 12 can be provided with a slightly negative potential by a voltage divider including a pair of resistance elements 16 and 18 which are connected between a negative voltage source of approximately 12 volts and ground. Similarly, the base electrode of the transistor 14 can be supplied with a slightly negative potential by a voltage divider including a pair of resistance elements 20 and 22 which are connected in series between the negative potential source and ground. The base electrode of the transistor 12 is cross-coupled to the collector electrode of the transistor 14 through a coupling capacitor 24, and the base electrode of the transistor 14 is cross-coupled to the collector electrode of the transistor 12 by a capacitor 26. The emitter electrode of the transistor 12 is connected directly to ground, whereas the emitter electrode of the transistor 14 is connected to ground through a resistance element 28 in the base electrode circuit of a semiconductor device or transistor 30 forming an output buffer amplifier. The collector electrode of the transistor 12 is connected to the negative voltage source through a resistance element 32, and the collector electrode of the transistor 14 is connected to the negative voltage source through a resistance element 34.

Referring now more specifically to the operation of the multivibrator 10, it is assumed that the transistor 12 is in a conductive or current saturated state and that the transistor 14 begins to conduct. The initiation of conduction in the transistor 14 places a point "*a*" substantially at ground potential because of the low impedance path through the current saturated device 14. When the potential of the point "*a*" is elevated toward ground, the coupling capacitor 24, which has been substantially fully charged over a circuit including the resistors 18 and 34, drives the base electrode of the transistor 12 to a positive potential relative to the potential of its emitter electrode so that this transistor is cut-off. When the transistor 12 is cut-off, the coupling capacitor 26 begins to charge over a circuit including the resistance elements 32 and 22. The flow of charging current through the resistance element 22 supplements the negative potential provided by the voltage divider including the resistance elements 20 and 22 for maintaining the base of the transistor 14 negative with respect to its emitter electrode so that the transistor 14 remains in a conductive state.

With the transistor 14 in a conductive state, a circuit is completed including the transistor 14 and the resistance element 18 for discharging the coupling capacitor 24. When this condenser has been sufficiently discharged, the base electrode of the transistor 12 is returned to a negative potential relative to its emitter electrode by the voltage divider including the elements 16 and 18. The transistor 12 now becomes conductive so that the potential of a point "*b*" rises substantially to ground potential, again due to the low impedance path through the current saturated device 12. By placing the point "*b*" at substantially ground potential, the base electrode of the transistor 14 is driven positive relative to its emitter electrode so that conduction through the transistor 14 is substantially terminated. This permits the capacitor 24 to again charge over a circuit including the resistance elements 18 and 34, the flow of charging current through the resistor 18 aiding in holding the base electrode of the device 12 at a negative potential relative to its emitter electrode. endering the transistor 12 conductive also completes a circuit for discharging the capacitor 26 which includes the resistance element 22 and the conductive transistor 12. Thus, when the charge on the capacitor 26 has been sufficiently dissipated to permit the base electrode of the transistor 14 to attain a potential which is negative with respect to its emitter electrode, the transistor 14 is again rendered conductive to cut-off conduction in the transistor 12 in the manner described above.

Accordingly, the frequency at which the transistors 12 and 14 are alternately rendered conductive is determined by the time constants of the circuits including the coupling capacitors 24 and 26. Thus, if the transistors 12 and 14 are to have equal periods of conduction, the time constants of the RC circuits including the capacitors 24 and 26 are adjusted to have the same values.

To provide means for uniformly adjusting the frequency of operation of the multivibrator 10, a variable capacitor 36 is provided which is directly connected between the base electrodes of the transistors 12 and 14. Thus, when the transistor 12, for instance, is placed in a conductive or current saturated condition, the variable capacitor 36 is effectively connected in parallel with the coupling capacitor 26 through the current saturated collector electrode of the device 12. As described above, the period during which the transistor 12 is maintained conductive is determined by the length of time that is required to effectively discharge the coupling capacitor 26 and thus to effect re-operation of the transistor 14. By switching the variable capacitor 36 in parallel with the capacitor 26 during the discharge of this latter capacitor, the discharge time thereof can be reduced or increased in accordance with the setting of the variable capacitor 36. Thus, if the variable capacitor 36 is adjusted to provide a greater value of capacitance, the discharge time of the capacitor 12 is increased. Similarly, when the transistor 14 is rendered conductive, the saturated collector electrode of this transistor places the variable capacitor 36 in parallel with the coupling capacitor 24 so that the discharge period of this capacitor is similarly increased or decreased in accordance of the setting of the variable capacitor 36, thereby to determine the period of conduction of the transistor 14. Accordingly, by the provision of the variable capacitor 36 connected between the base electrodes of the transistors 12 and 14, the periods during which the transistors 12 and 14 are in a current saturated or conductive condition can be uniformly or equally adjusted.

To provide a means for deriving an output from the multivibrator 10, a buffer amplifier stage including the transistor 30 is provided. Accordingly, when the transistor 14 is placed in a conductive or current saturated condition so that current flows through the resistor 28, the base electrode of the transistor 30 is driven negative relative to its grounded emitter. This causes an increased current flow through a resistor 38 connected in the collector electrode circuit of the transistor 30. When the transistor 14 is cut-off, conduction through the transistor 30 is also terminated to reduce the current flow through the resistance element 38. Thus, a voltage of suitable waveform is supplied to an output terminal 40.

The following listed types and values of circuit components provide a multivibrator 10 for generating an output voltage of a frequency which can be adjusted between 1875 and 2125 cycles per second. However, it should be understood that many other values and types of circuit components can be used in providing a multivibrator embodying the present invention.

| | |
|---|---|
| Transistor **12** | 2N123 |
| Transistor **14** | 2N123 |
| Resistor **16** | 62K |
| Resistor **18** | 18K |
| Resistor **20** | 62K |
| Resistor **22** | 18K |
| Capacitor **24** ... μfd | .01 |
| Capacitor **26** ... μfd | .01 |
| Resistor **28** ... ohms | 68 |
| Transistor **30** | 4JD1A73 |
| Resistor **32** | 2K |
| Resistor **34** | 2K |
| Variable capacitor **36** ... μfd | 350–1180 |
| Resistor **38** | 1K |

Although the present invention has been described with reference to a single embodiment thereof, it should be understood that many other modifications and embodiments may be devised by those skilled in the art which will fall within the spirit and scope of hte principles of this invention.

What is claimed and desired to be secured by Letters Patent of the United States is:

1. A multivibrator comprising a pair of transistors each including at least an emitter electrode, a base electrode, and a collector electrode; a pair of capacitors each coupling the collector electrode of one of the transistors to the base electrode of the other of the electrodes; a potential source connected to said emitter and collector electrodes for energizing said pair of transistors so that said transistors are alternatively rendered conductive for periods determined at least in part by the values of said capacitors; and a variable capacitor connected between the base electrodes of said transistors for adjusting the periods that both of said transistors are rendered conductive.

2. A multivibrator comprising a pair of semiconductor devices each including at least an emitter electrode, a base electrode, and a collector electrode; a pair of capacitors each connected between the base electrode of one of said devices and the collector electrode of the other of said devices; energizing means connected across said emitter and collector electrodes; means including means for charging said capacitors for alternately rendering said devices conductive; and adjustable capacitive means connected between said base electrodes of said pair of devices for alternately adjusting the period of conduction of each of said devices.

3. A multivibrator comprising a pair of semi-conductor devices each including at least an emitter electrode, a base electrode, and a collector electrode; a pair of capacitors; means connecting a first one of said capacitors between the base electrode of one of said devices and the collector electrode of the other of said devices; means connecting a second one of said capacitors between the base electrode of said other device and the collector electrode of said one device; means connected to said emitter and collector electrodes for energizing said pair of devices so that said devices are alternately rendered conductive; a capacitive element; and means including the base electrode-collector electrode paths of said pair of devices for alternately connecting said capacitive element in parallel with said first and second capacitors in accordance with the alternating conduction in said devices.

4. A multivibrator comprising a pair of semiconductor devices each including at least an emitter electrode, a base electrode, and a collector electrode; a first capacitor coupled between the base electrode of one of said devices and the collector electrode of the other of the devices; a second capacitor coupled between the base electrode of said other of the devices and the collector electrode of said one device; means connected to said emitter and collector electrodes for energizing said devices so that said devices are alternately rendered conductive; said energizing means including separate circuit means for alternatively charging said first and second capacitors; a capacitive element; and control means including said capacitive element and the base electrode-collector electrode paths of said pair of semiconductor devices for controlling the alternate discharge of said first and second capacitors.

5. A multivibrator comprising first and second transistors each including at least a control electrode and a pair of output electrodes, first means coupling one of the output electrodes of said first transistor to the control electrode of said second transistor, second means coupling one of the output electrodes of said second transistor to the control electrode of said first transistor, means connected to said output electrodes for energizing said first and second transistors so that said first and second transistors are alternately rendered conductive, third means for controlling the frequency at which said first and second transistors are rendered alternately conductive, and means including the base electrode-collector electrode paths of said first and second transistors for rendering said third means alternately effective to control said first and second means.

References Cited in the file of this patent

UNITED STATES PATENTS

| | | |
|---|---|---|
| 2,070,647 | Braaten | Feb. 16, 1937 |
| 2,079,134 | Terman | May 4, 1937 |
| 2,154,200 | Dow | Apr. 11, 1939 |
| 2,356,071 | MacDonald et al. | Aug. 15, 1944 |
| 2,373,560 | Hanert | Apr. 10, 1945 |
| 2,491,387 | Miller | Dec. 13, 1949 |
| 2,843,745 | Smith | July 15, 1958 |